United States Patent Office 3,499,899
Patented Mar. 10, 1970

3,499,899
NOVEL PHENAZINE COMPOUNDS AND PROCESS
André Girard and André Ray, Paris, France, assignors to Roussel UCLAF, Paris, France, a corporation of France
No Drawing. Filed Oct. 21, 1968, Ser. No. 769,383
Claims priority, application France, Oct. 24, 1967, 125,628; Jan. 24, 1968, Ser. No. 137,288
Int. Cl. C07d 51/80
U.S. Cl. 260—267      14 Claims

ABSTRACT OF THE DISCLOSURE

Novel 3,5-dihydrophenazines of the formula

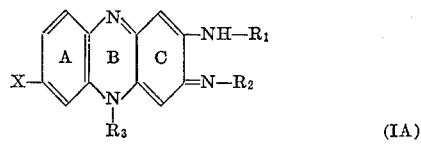

(IA)

wherein X is selected from the group consisting of hydrogen and halogen, $R_1$ is an aromatic radical substituted with an aliphatic group containing a dialkyl amino chain and which is connected to the aromatic nucleus by a carbon atom, oxygen atom or nitrogen atom, $R_2$ is an aliphatic radical containing a primary or secondary hydroxy and $R_3$ is a substituted or unsubstituted aromatic radical and their nontoxic, pharmaceutically acceptable acid addition salts which have an important antibacillus activity and to a novel process for the preparation of 2-amino-3-imino-3,5-dihydrophenazines of Formula IB and to novel intermediates formed therein.

PRIOR ART

Barry et al. (J. Chem. Soc., 1956, pgs. 888, 893 and 896 and 1958, pg. 859) describes 2-p-chlorophenyl-3-isopropylimino - 5 - p - chlorophenyl - 3,5 - dihydrophenazine (B663) and 2-phenyl - 3 - diethylaminoethylimino-5-phenyl-3,5-dihydrophenazine (B720) containing anti-tubercular activity in infected mice.

The first compound is a lipophilic compound which is very insoluble in water, accumulates in fats and is difficult to administer by the oral route where it is scarcely active. The second compound is a compound substantially more soluble in water and does not accumulate in the adipose tissue of animals, but it does accumulate in the organs. There results a definite difference in activity since, for an identical efficacy in vitro or in vivo in abortive treatment of tuberculosis, B663 is active in prolonged curative treatment while B720 is practically inactive and gives only a few days' survival to mice made tubercular.

In addition, B663 reinforces the activity of other anti-tubercular products by delaying the appearance of resistant strains while B720 improves only very slightly the effect of isoniazide and delays only very slightly the appearance of isoniazido-resistant strains. Moreover, Barry et al. mention that the compounds substituted on the A-nucleus by a chlorine atom do not possess any practical action (Barry, J. Chem. Soc., 1956, p. 898). It thus appears from the literature that for a dihydrophenazine derivative to possess a curative action with respect to experimental tuberculosis, it must have two structural requirements: (1) lipophilic character of the molecule preventing the presence of any group capable of conferring solubility in water; and (2), absence of any substituent on the A-nucleus of the phenazine. These two requirements condition the penetration of the product into the organism and into the bacillus so as the latter becomes vulnerable to the leucocytes.

OBJECTS OF THE INVENTION

It is an object of the invention to provide novel 3,5-dihydrophenazines of Formula IA.

It is another object of the invention to provide a novel process for the preparation of 2-amino-3-imino-3,5-dihydrophenazines of Formula IB.

It is an additional object of the invention to provide novel intermediates for the preparation of 3,5-dihydrophenazines.

These and other objects and advantages of the invention will become obvious from the following detailed description.

THE INVENTION

The novel 3,5-dihydrophenazines of the invention are selected from the group consisting of compounds of the formula

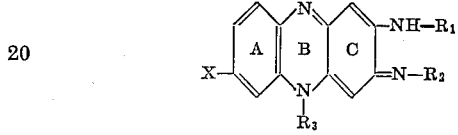

wherein X is selected from the group consisting of hydrogen and halogen, $R_1$ is an aromatic radical substituted with an aliphatic group containing a dialkylamino chain and which is connected to the aromatic nucleus by a carbon atom, oxygen atom or nitrogen atom, $R_2$ is an aliphatic radical containing a primary or secondary hydroxy and $R_3$ is a substituted or unsubstituted aromatic radical and their non-toxic, pharmaceutically acceptable acid addition salts.

Examples of suitable substituents of Formula IA and $R_1$ are phenyl groups substituted with dilower alkylamino lower alkyl and lower alkoxy radicals such as dimethylaminoethoxy, diethylaminoethoxy, dimethylamino methyl, diethylaminomethyl, dimethylamino ethyl, etc., and dilower alkylamino-lower-alkylamino groups such as dimethylaminoethylamino, diethylaminoethylamino, etc. Examples of $R_2$ are hydroxy lower alkyl groups such as β-hydroxy ethyl, 2-hydroxypropyl, 3-hydroxypropyl, 2-hydroxy-3-methoxypropyl, 2-hydroxybutyl, etc. Examples of $R_3$ substituents are phenyl radicals which may be substituted with halogens such as fluorine, chlorine, bromine or lower alkoxy, such as ethoxy, methoxy, etc. The term lower alkoxy or alkyl is intended to mean 1 to 7 carbon atoms.

Surprisingly, 3,5-dihydrophenazines of Formula IA possess an important antibacillae activity in warmblooded animals. Particularly important is the fact that the presence of the secondary or primary alcohol function on the imino radical effects a considerable reduction of toxicity and local irritant power without influencing the fundamental activity of the compounds. In addition, this alcohol function modifies profoundly and favorably the tissue distribution of the compounds in the animal organisms.

The amino-alcohols of Formula IA are notable for their therapeutic activity in experimental tuberculosis in mice and guinea pigs. It is thus possible to prepare injectable substances whose curative activity, no longer only abortive in mice and particularly in guinea pigs, shows itself 10 to 20 times greater than that of streptomycin when administered parenterally.

In view of the prior art discussed supra, it is surprising that the compounds of Formula IA which have a substituent of hydrophilic character at the 2-position, a substituent of a doubly hydrophilic character at the 3-position (an alcohol function and an imine function) and may have a halogenated substituent on the A-nucleus, simultaneously exhibit curative properties with respect to experimental tuberculosis and synergistic properties when used with other anti-tubercular compounds such as isoniazide. Moreover, the hydrophilic character of the molecule gives a certain solubility in aqueous media and therefore the products can be administered either by oral route or parenterally and there results an infinitely greater diffusion in the organism and speed of action. The compounds of Formula IA have a greater intensity of action as they are active at a dose of 0.1 mg. or 0.2 mg. while B663 at these doses does not protect the mice, and the mortality is similar to that of the control batch.

Examples of suitable acids for the formation of non-toxic-pharmaceutically acceptable acid addition salts are inorganic acids, such as sulfuric acid, hydrochloric acid, phosphoric acid, etc., and organic acids such as acetic acid, citric acid, tartaric acid, lactic acid, methanesulfonic acid, succinic acid, etc.

Among the interesting compounds for Formula IA, 2-[p-($\beta$-dimethylaminoethoxy) - anilino] - 3$\beta$ - hydroxypropylimino-5-p-chlorophenyl-3,5-dihydrophenazine and 2-[p - (dimethylaminomethyl) - anilino]-3$\beta$-hydroxypropylimino-5-p-chlorophenyl-3,5-dihydrophenazine are of particular interest due to their high degree of activity.

The novel process of the invention is for the preparation of 3,5-dihydrophenazines of the formula

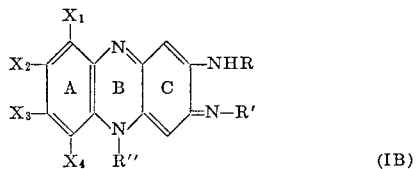

(IB)

wherein R, R' and R'' are aromatic or aliphatic radicals which may be substituted and R' may also be hydrogen and $X_1$, $X_2$, $X_3$ and $X_4$ may be hydrogen or halogen or an optionally substituted alkyl, aryl or alkoxy radical. The process has the advantage of introducing any desired substituent onto the 2-amino-3-imino-3,5-dihydrophenazine nucleus to modify the physical, chemical and/or biological properties of the compounds as desired.

The said process comprises condensing 1,3-dichloro-4,6-dinitrobenzene in the presence of an acid acceptor with an o-phenylenediamine of the formula

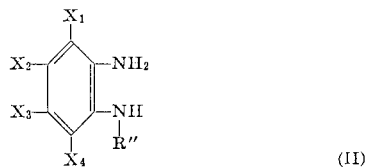

(II)

wherein $X_1$, $X_2$, $X_3$, $X_4$ and R'' have the foregoing definitions to form a substituted diphenylamine of the formula

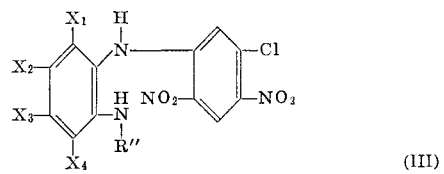

(III)

reacting the latter in an organic solvent with a primary amine of the formula H$_2$NR wherein R has the foregoing definition to form a compound of the formula

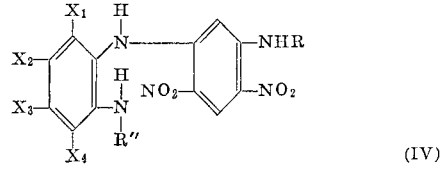

(IV)

reducing the said compound with a reducing agent to form a tetramine diphenylamine of the formula

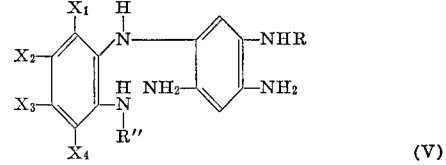

(V)

and oxidizing the latter with an oxidizing agent to form the corresponding 2-amino-3-imino-3,5-dihydrophenazine of Formula IB wherein R' is hydrogen. To form the compound of Formula IB wherein R' is aromatic or aliphatic, the latter product is reacted with a primary aromatic or aliphatic amine to form the said substituted 3-imino compound.

The condensation of 1,3-dichloro-4,6-dinitrobenzene with the o-phenylenediamine is preferably effected in the presence of a tertiary base such as pyridine, triethylamine, quinoline or dimethylaniline in an organic solvent such as a lower alkanol or an alkoxy alkanol such as 2-ethoxyethanol. The condensation of the primary amine with diphenylamine of Formula III is preferably effected at temperatures between 100 and 150° C. in an organic solvent such as dimethylformamide, dioxane or an alkanol with high boiling point such as propanol or butanol. The reducing agent may be zinc in the presence of acetic acid or hydrogen in the presence of a suitable catalyst. The oxidizing agent may be oxygen or air.

In a variation of the process of the invention, 1,3-dichloro-4,6-dinitrobenzene is condensed with a primary amine of the formula N$_2$N—R to obtain the corresponding 1-chloro-3-RNH-4,6-dinitrobenzene which is then reacted with an o-phenylenediamine of Formula II to form the corresponding compound of Formula IV and the rest of the synthesis is then followed as above.

In Formula IB, $X_1$, $X_2$, $X_3$ and $X_4$ may be hydrogen, halogens such as fluorine, bromine and chlorine; lower alkyl radicals such as methyl, ethyl and propyl; halogenated alkyl such as chloromethyl, trifluoromethyl, etc.; lower alkoxy such as methoxy; and aryl radicals such as phenyl, p-chlorophenyl, o,p-dichlorophenyl, etc.; R, R' and R'' may be aliphatic or aromatic which can contain heterocyclic groups and R' may also be hydrogen. Examples of suitable aliphatic radicals are lower alkyl and hydroxy lower alkyl such as methyl, ethyl, propyl, isopropyl, tert.-butyl, n-butyl, 2-hydroxypropyl, 2-hydroxyethyl, 3-hydroxypropyl, 2-hydroxybutyl; lower alkoxy radicals such as ethoxy, 2-methoxyethyl, 2-ethoxyethyl, 2-hydroxy - 3 - methoxy-propyl, 2 - (dimethylaminoethoxy) ethyl, etc. Examples of suitable aromatic substituents are phenyl; halophenyl such as p-chlorophenyl; lower alkyl and lower alkoxy phenyl such as p-ethoxyphenyl, o-methoxyphenyl, tolyl, etc., substituted phenyl such as 2-dimethylaminoethoxyphenyl, 2-diethylaminoethoxy, diethylaminomethyl, dimethylaminomethyl, 2-pentamethyleneamino - ethoxy - phenyl, 2-diethylaminoethylaminophenyl, pyrrolidinomethylphenyl, etc.

In the following examples there are described several preferred embodiments to illustrate the invention. However, it should be understood that the invention is not intended to be limited to the specific embodiments.

Example I.—Preparation of 2-[p-($\beta$-dimethylaminoethoxy) - anilino] - 3 - propyl - imino - 5 - p - chlorophenyl-3,5-dihydrophenazine Step A: 3-chloro-4,6-dinitro-2'-p-chloroanilinodiphenylamine.—24 g. of 1,3-dichloro-4,6-dinitrobenzene were dissolved in 100 cc. of ethanol and the solution was admixed with 22 g. of 2-amino-4'-chlorodiphenylamine and 11 g. of triethylamine. The mixture was heated at reflux for one hour, cooled and suction filtered. The solid was washed with water and then with methanol to obtain a 93% yield of 3-chloro-4,6-dinitro-2'-p-chloroanilino-diphenylamine in the form of dark red crystals and having a melting point of 188° C.

As far as is known, this compound is not described in the literature.

Step B: 3 - [p - (β-dimethylaminoethoxy)-anilino]-4,6-dinitro-2'-p-chloroanilinodiphenylamine.—42 gm. of 3-chloro-4,6-dinitro - 2' - p-chloroanilinodiphenyl-amine and 20 gm. of p - (β - dimethylaminoethoxy) - aniline were heated at reflux with 140 cc. of propanol. Heating was continued for two hours after complete dissolution occurred. The said solution was admixed with 200 cc. of water and 20 cc. of ammonia and suction-dried. The precipitate was washed with water and with cold methanol to obtain a 95% yield of 3-[p-(β-dimethylaminoethoxy) - anilino] - 4,6-dinitro-2'-p-chloroanilinodiphenylamine in the form of small bright flakes of ochre color and having a melting point of 120–122° C.

As far as is known, this compound is not described in the literature.

Step C: 3 - [p - (β-dimethylaminoethoxy)-anilino]-4,6 diamino-2'-p-chloroanilinodiphenylamine.—56 g. of the nitro derivative obtained in Step B were dissolved in 300 cc. of acetic acid and under good agitation, 75 g. of zinc powder were added gradually while regulating the temperature between 20° C. and 40° C. When a new addition of zinc produced no further rise in temperature, the zinc acetate and the excess metal was separated by filtering and washed with acetic acid to obtain a light green liquid containing 3 - [p - β - dimethylaminomethoxy)-anilino] - 4,6 - diamino-2'-p-chloroanilinodiphenylamine which is used as it is for the next step of the synthesis.

As far as is known, the said compound is not described in the literature.

Step D: 2 - [p - (β - dimethylaminoethoxy-anilino]-3-imino - 5-p-chlorophenyl-3,5 - dihydrophenazine.—The light green liquid obtained in Step C was subjected to oxidation by prolonged agitation in contact with air or with pure oxygen.

The acetic acid solution obtained was concentrated to dryness and the residue was dissolved in water. The said solution was made alkaline by addition of ammonia and then was extracted with ethylene chloride. The ethylene chloride extracts were concentrated to dryness and the residue was recrylstallized from methyl isobutyl ketone to obtain brilliant brown crystals of 2-[p-(β-dimethylaminoethoxy)-anilino]- 3-imino-5-p-chlorophenyl-3,5-dihydrophenazine having a melting point of 188–190° C. The said product was soluble in acids.

As far as is known, this compound is not described in the literature.

The product obtained may be isolated in the form of a salicylic complex. For this purpose, the acetic acid solution obtained after oxidation was concentrated to one half of its volume under reduced pressure and after the addition of 200 cc. of water thereto, 200 cc. of 2 N sodium salicylate solution was added with stirring. After standing for 24 hours, the reaction mixture was suction filtered and the precipitate was washed with ice-cooled aqueous acetic acid, with water and then air-dried to obtain 88 gm. of a salicylic complex of 2-[p-(β-dimethylaminoethoxy)-anilino] - 3-imino-5-p-chlorophenyl-3,5-dihydrophenazine.

Step E: 2-[p-(β-dimethylaminoethoxy)-anilino]-3-propylimino-5-p-chlorophenyl - 3,5 - dihydrophenazine.— A mixture of 25 g. of the imino base obtained in Step D, 100 g. of propylamine and 3 cc. of acetic acid was heated for five hours at reflux, and after eliminating the excess amine by distillation at ordinary pressure and then in vacuo, the dry residue was extracted with benzene. The extracts were washed with ammonia water, dried and concentrated to dryness. The residue was recrystallized from acetone to obtain 23 g. of 2-[p-(β-dimethylaminoethoxy) - anilino]-3-propylimino-5-p-chlorophenyl-3,5-dihydrophenazine having a melting point of 152° C.

As far as is knnown, this compound is not described in the literature.

Using the method of Example I and by selecting the appropriate amine, the compounds of Formula IB set forth in Table I were prepared. As far is known, these compounds are not described in the literature.

TABLE I

| $X_1$ | $X_2$ | $X_3$ | $X_4$ | R | R' | R'' | Melting Point, °C. |
|---|---|---|---|---|---|---|---|
| H | H | H | H | —C₆H₄—OCH₂CH₂N(CH₃)₂ | —CH₃ | —C₆H₄—Cl | 164 |
| H | H | H | H | —C₆H₄—OCH₂CH₂N(CH₃)₂ | —C₂H₅ | —C₆H₄—Cl | 158 |
| H | H | H | H | —C₆H₄—OCH₂CH₂N(CH₃)₂ | —HC(CH₃)₂ | —C₆H₄—Cl | 195 |
| H | H | H | H | —C₆H₄—OCH₂CH₂N(CH₃)₂ | —C(CH₃)₃ | —C₆H₄—Cl | 220 |
| H | H | H | H | —C₆H₄—OCH₂CH₂N(CH₃)₂ | —CH₂CH₂OCH₃ | —C₆H₄—Cl | 150 |
| H | H | H | H | —C₆H₄—OCH₂CH₂N(CH₃)₂ | —CH₂CH₂OCH₂CH₂N(CH₃)₂ | —C₆H₄—Cl | 110 |
| H | H | H | H | —C₆H₄—OCH₂CH₂N(CH₃)₂ | —CH₂CH₂OC₂H₅ | —C₆H₄—Cl | 189 |
| H | H | H | H | —C₆H₄—OCH₂CH₂N(CH₃)₂ | —CH₂—CHOH—CH₃ | —C₆H₄—Cl | 195 |
| H | H | H | H | —C₆H₄—OCH₂CH₂N(CH₃)₂ | —CH₂CH₂CH₂OH | —C₆H₄—Cl | 167 |
| H | H | H | H | —C₆H₄—OCH₂CH₂N(CH₃)₂ | —CH₂CHOH—CH₂OCH₃ | —C₆H₄—Cl | 132 |

TABLE I—Continued

| $X_1$ | $X_2$ | $X_3$ | $X_4$ | R | R' | R'' | Melting Point, °C. |
|---|---|---|---|---|---|---|---|
| H | H | H | H | —⟨phenyl⟩—OCH$_2$CH$_2$N(CH$_3$)$_2$ | —CH$_2$CH$_2$OH | —⟨phenyl⟩—Cl | 189 |
| H | H | H | H | —⟨phenyl⟩—OCH$_2$CH$_2$N(CH$_3$)$_2$ | —CH$_2$CHOH—CH$_2$CH$_3$ | —⟨phenyl⟩—Cl | 165–168 |
| H | H | H | H | —⟨phenyl⟩—OCH$_2$CH$_2$N(CH$_3$)$_2$ | —CH$_2$CHOH—CH$_2$CH$_3$ | —⟨phenyl⟩—Cl | 155 |
| H | H | H | H | —⟨phenyl⟩—OCH$_2$CH$_2$N⟨ring⟩ | —CH$_2$CH$_2$OH | —⟨phenyl⟩—Cl | 196–198 |
| H | H | Cl | H | —⟨phenyl⟩—OCH$_2$CH$_2$—N(C$_2$H$_5$)$_2$ | —CH$_2$CH$_2$OH | —C$_6$H$_5$ | 153–154 |
| H | H | H | H | —⟨phenyl⟩—OCH$_2$CH$_2$—N(C$_2$H$_5$)$_2$ | —CH$_2$CH$_2$OH | —C$_6$H$_5$ | 142 |
| H | H | H | H | —⟨phenyl⟩—OCH$_2$CH$_2$—N(C$_2$H$_5$)$_2$ | —CH$_2$CHOHCH$_3$ | —C$_6$H$_5$ | 132 |
| H | H | H | H | —⟨phenyl⟩—OCH$_2$CH$_2$—N(CH$_3$)$_2$ | —CH$_2$CH$_2$OH | —C$_6$H$_5$ | 166 |
| H | H | H | H | —⟨phenyl⟩—OCH$_2$CH$_2$—N(CH$_3$)$_2$ | —CH$_2$CH$_2$OH | —⟨phenyl⟩—OC$_2$H$_5$ | 138 |
| H | H | H | H | —⟨phenyl⟩—OCH$_2$CH$_2$—N(CH$_3$)$_2$ | —CH$_2$CHOHCH$_3$ | —C$_6$H$_5$ | 164 |

Example II.—Preparation of 2-[p-(β-diethylaminoethoxy) - anilino]-3 - methylimino - 5-p-chlorophenyl-3,5-dihydrophenazine Using the procedure of Step B of Example I, 3-chloro-4,6-dinitro-2′-p-chloroanilinodiphenylamine described in Step A of Example I, was condensed with p-(β-diethylamininoethoxy)-aniline to obtain 3-[p-(β-diethylaminoethoxy)-anilino] - 4,6-dinitro-2′p-chloroanilino-diphenylamine having a melting point of 135–136° C.

As far as is known, this compound is not described in the literature.

Then using the methods of Steps C and D of Example I, 3-[p-(β-diethylaminoethoxy)-anilino]-4,6-diamino-2′-p-chloroanilinodiphenylamine and 2-[p-(β-diethylaminoethoxy)-anilino] - 3-imino-5-p-chlorophenyl-3,5-dihydrophenazine having a melting point of 95° C. were obtained successively.

As far as is known, these two compounds are not described in the literature.

Finally, using the method of Step E of Example I, by effecting the aminolysis with methylamine, 2-[p-(β-diethylaminoethoxy) - anilino] - 3-methylimo-5-p-chlorophenyl-3,5-dihydrophenazine having a melting point of 133° C. was obtained.

As far as is known, this compound is not described in the literature.

Using the process of Example II and by selecting the appropriate amine of the compounds of Formula IB set forth in Table II were prepared. As far as is known, these compounds are not described in the literature.

TABLE II

| $X_1$ | $X_2$ | $X_3$ | $X_4$ | R | R' | R'' | Melting Point, °C. |
|---|---|---|---|---|---|---|---|
| H | H | H | H | —⟨phenyl⟩—OCH$_2$CH$_2$N(—C$_2$H$_5$)$_2$ | —C$_2$H$_5$ | —⟨phenyl⟩—Cl | 145 |
| H | H | H | H | —⟨phenyl⟩—OCH$_2$CH$_2$N(—C$_2$H$_5$)$_2$ | —C$_3$H$_7$—n | —⟨phenyl⟩—Cl | 142 |
| H | H | H | H | —⟨phenyl⟩—OCH$_2$CH$_2$N(—C$_2$H$_5$)$_2$ | —C$_4$H$_9$—n | —⟨phenyl⟩—Cl | 130 |
| H | H | H | H | —⟨phenyl⟩—OCH$_2$CH$_2$N(—C$_2$H$_5$)$_2$ | —CH$_2$CH$_2$OH | —⟨phenyl⟩—Cl | 165 |
| H | H | H | H | —⟨phenyl⟩—OCH$_2$CH$_2$N(—C$_2$H$_5$)$_2$ | —CH$_2$CHOH—CH$_3$ | —⟨phenyl⟩—Cl | 164; 165 |

Example III.—Preparation of 2-[p-(β-pentamethyleneaminoethoxy) - anilino-3-ethylimino-5-phenyl-7-chloro-3,5-dihydrophenazine Using the process of Example I, 2-amino-5-chloro-diphenylamine was condensed with 1,3-dichloro-4,6-dinitrobenzene to obtain 3-chloro-4,6,-dinitro-4'-chlorodiphenylamine having a melting point of 174° C.

As far as is known, this compound is not described in the literature.

This diphenylamine was reacted in a propanol medium with p-(β-pentamethyleneaminoethoxy)-aniline to obtain 3 - [p - β - pentamethyleneaminoethoxy) - anilino] - 4,6 - dinitro-2'-anilino-4'-chlorodiphenylamine having a melting point of 165° C.

As far as is known, this compound is not described in the literature.

ing point of 205° C., 3-n-propylamino-4,6-dinitro-2'-p-chloroanilinodiphenylamine, and having a melting point of 176° C. and 3-n-butylamino-4,6-dinitro-2'-p-chloroanilinodiphenylamine, having a melting point of 147° C., respectively.

The said compounds were subjected to reduction and then to oxidation to obtain 2-ethylamino-3-imino-5-p-chlorophenyl-3,5-dihydrophenazine having a melting point of 184° C., 2-n-propylamino-3-imino-5-p-chlorophenyl-3,5-dihydrophenazine having a melting point of 196° C. and 2-n-butylamino-3-imino-5-p-chlorophenyl-3,5-dihydrophenazine having a melting point of 208°–210° C., respectively.

Aminolysis of the said compounds with p-(β-diemethylaminoethoxy)-aniline gave the following compounds of Formula IB:

TABLE IV

| $X_1$ | $X_2$ | $X_3$ | $X_4$ | R | R' | R'' | Melting Point, °C. |
|---|---|---|---|---|---|---|---|
| H | H | H | H | $-C_2H_5$ | -⌬-OCH$_2$CH$_2$N(CH$_3$)$_2$ | -⌬-Cl | 175 |
| H | H | H | H | n-C$_3$H$_7$ | -⌬-OCH$_2$CH$_2$N(CH$_3$)$_2$ | -⌬-Cl | 157 |
| H | H | H | H | n-C$_4$H$_9$ | -⌬-OCH$_2$CH$_2$N(CH$_3$)$_2$ | -⌬-Cl | 215 |

Reduction with zinc in an acetic acid medium, followed by oxidation, gave 2-[p-(β-pentamethyleneaminoethoxy)-anilino]-3-imino-5-phenyl-7-chloro - 3,5 - dihydrophenazine having a melting point of 215° C.

As far as is known, this compound is not described in the literature.

Aminolysis with ethylamine finally provided 2-[p-(β-pentamethyleneaminoethoxy)-anilino] - 3 - ethylamino-5-phenyl-7-chloro-3,5-dihydrophenazine having a melting point of 146° C.

As far as is known, this compound is not described in the literature.

By effecting aminolysis with other amines, the following products of Formula IB were obtained.

As far as is known, all the compounds thus obtained are not described in the literature.

Example V.—Preparation of 2-[m-(N,N-dimethylaminomethyl)-anilino] - 3 - ethylimino-5-p-chlorophenyl-3,5-dihydrophenazine Using the procedure of Example I, 3-chloro-4,6-dinitro-2'-p-chloroanilinodiphenylamine of Step A of Example I, was condensed with m-amino-N,N-dimethylbenzylamine to obtain 3-[m-(N,N-dimethylaminomethyl)-anilino]-4,6-dinitro-2'-p-chloroanilinodiphenylamine having a melting point of 160° C. The latter compound was subjected to reduction and then to oxidation to give 2-[m-(N,N-dimethylaminomethyl) - anilino] - 3 - imino - 5 - p-chloro-

TABLE III

| $X_1$ | $X_2$ | $X_3$ | $X_4$ | R | R' | R'' | Melting point, °C. |
|---|---|---|---|---|---|---|---|
| H | H | Cl | H | -⌬-OCH$_2$CH$_2$N(CH$_2$-CH$_2$)$_2$CH$_2$ | $-C_4H_9-n$ | $C_6H_5$ | 144 |
| H | H | Cl | H | -⌬-OCH$_2$CH$_2$N(CH$_2$-CH$_2$)$_2$CH$_2$ | -⌬-OC$_2$H$_5$ | $C_6H_5$ | 223 |

As far as is known, these two compounds are not described in the literature.

Example IV.—Preparation of 2-(R-amino)-3-R'-imino-5-p-chlorophenyl-3,5-dihydrophenazine Using the procedure of Example I, 3-chloro-4,6-dinitro-2'-p-chloroanilinodiphenylamine of Step A of Example I, was condensed with ethylamine, n-propylamine and n-butylamine to obtain 3-ethylamino-4,6-dinitro-2'-p-chloro-anilinodiphenylamine having a meltphenyl-3,5-dihydrophenazine having a melting point greater than 220° C. This derivative was subjected to aminolysis to obtain 2-[m-(N,N-dimethylaminomethyl)-anilino]-3-ethylimino-5-p-chlorophenyl - 3,5 - dihydrophenazine having a melting point of 189° C.

In an analogous manner, the corresponding 3-n-propylimino (M.P.=175° C.) and 3-n-butylimino (M.P.=145° C.) derivatives were obtained.

As far as is known, the compounds thus obtained are not described in the literature.

Example VI.—Preparation of 2-[m-dimethylaminomethyl)-anilino] - 3 - ethylamino-5-phenyl-7-chloro-3,5-dihydrophenazine Using the procedure of Example V, 3-chloro-4,6-dinitro-2'-anilino-4'-chlorodiphenylamine of Example III was reacted to successively obtain the following compounds: 3-[m - (di-methylaminomethyl) - anilino]-4,6-dinitro-2'-anilino-4'- chlorodiphenylamine having a melting point of 198° C.; 2-[β-(dimethylaminomethyl)-anilino]-3-imino-5-phenyl-7-chloro-3,5-dihydrophenazine with a melting point greater than 220° C.; and 2-[m-(dimethylaminomethyl) - anilino]-3-ethylimino-5-phenyl-7-chloro-3,5-dihydrophenazine having a melting point of 182° C.

In an analogous manner, the corresponding 3-n-propylimino (M.P.=157° C.) and 3-n-butylimino
(M.P.=142° C.)
derivatives were obtained.

As far as is known, all these compounds are not described in the literature.

Example VII.—Preparation of 2-anilino- and 2-(p-ethoxyanilino) - 3 - propylimino-5-[p-(β-dimethylaminoethoxy)phenyl]-7-chloro-3,5-dihydrophenazine 2-amino-5-chloro - 4' - dimethylaminoethoxydiphenylamine was condensed in an ethanol medium with 1,3-dichloro-4,6-dinitrobenzene to obtain 2-chloro-4,6-dinitro-2'-[p - (β - dimethylaminoethoxy)-anilino] - 4'-chlorodiphenylamine having a melting point of 178° C. This substance was condensed in propanol at reflux with aniline or p-ethoxyaniline to obtain 2-anilino or 2-(p-ethoxyanilino) - 4,6 - dinitro - 2'-[p-(β-dimethylaminoethoxy)-anilino]-4'-chlorodiphenylamine with respective melting points of 145° C. and 155° C. By subjecting the latter compounds to reduction and then to oxidation, the corresponding imino derivatives of melting points of 201° C. and 204° C., respectively, were obtained. Aminolysis of the said imino compounds with n-propylamine in benzene gave 2 - anilino - 3 - propylimino-5-[p-(β-dimethylaminoethoxy)-phenyl]-7-chloro-3,5-dihydrophenazine having a melting point of 160° C. and the corresponding 2-(p-ethoxyanilino) derivative having a melting point of 156° C.

As far as in known, all these compounds are not described in the literature.

2-amino-5 - chloro - 4' - dimethylaminoethoxydiphenylamine was prepared by heating 40.5 g. of 2,4-dichloronitrobenzene in 100 cc. of methanol with 37 g. of p-dimethylaminoethoxyaniline and 21 g. of triethylamine for one hour at reflux. Water was added and the precipitate thus formed was dissolved in ether. The ethereal solution was stirred with 2 N hydrochloric acid to cause the precipitate thus formed to pass into aqueous solution which was made alkaline and re-extracted with ether. By evaporation of the ether solvent an uncrystallizable oil was obtained which was converted into a dinitrobenzoate in an alcoholic medium. The melting point of the picrate was 150° C. and the yield was 90%.

The dinitrobenzoate was decomposed in an alkali medium, extracted with ether and the residue was reduced with iron to give 2-amino-5-chloro-4'-dimethylaminoethoxydiphenylamine having a melting point of 125° C.

Example VIII.—Preparation of 2-[p-(β-diethylaminoethylamino) - anilino] - 3-ethylimino-5-p-chlorophenyl-3,5-dihydrophenazine 33.5 g. of 3-chloro - 4,6 - dinitro-2'-p-chloroanilinodiphenylamine and 18.3 g. of N-[(β-diethylamino)-ethyl]-p-phenylenediamine were heated at reflux for two hours in 120 cc. of propanol. Aqueous sodium hydroxide was added thereto and the mixture was suction-filtered. The precipitate was washed with water and then recrystallized from ethanol to obtain 3-[p-(β-diethylaminoethylamino)- anilino]-4,6-dinitro-2'-p-chloroanilinodiphenylamine having a melting point of 108° C.–110° C.

Reduction of the said product followed by oxidation gave 2-[p-(β-diethylaminoethylamino)-anilino]-3-imino-5-p-chlorophenyl-3,5-dihydrophenazine having a melting point of 120° C. Aminolysis of the latter with ethylamine gave 2-[p-(β-diethylamino-ethylamino)-anilino]-3-ethylimino-5-p-(β-diethylamino-ethylamino)-anilino]-3 - ethylimino-5-p-chlorophenyl-3,5-dihydrophenazine having a melting point of 162° C.–163° C.

In an analogous manner, the corresponding 3-n-propylimino (M.P.=174° C.). 3-n-butylimino (M.P.=133° C.), and 3-β-hydroxypropylimino (M.P.=145° C.) derivatives were obtained.

As far as in known, all these compounds are not described in the literature.

Example IX.—Preparation of 2 - [p - dimethylaminomethyl) - anilino]-3-β-hydroxy-ethylimino-5-phenyl-7-chloro-3,5-dihydrophenazine 3-chloro - 4,6 - dinitro - 2'-anilino-4'-chlorodiphenylamine, described in Example III, was heated for an hour and a half at reflux with p-amino-N,N-dimethylbenzylamine in dimethylformamide. A precipitate formed with the addition of an aqueous solution of sodium hydroxide and the residue was recrystallized from propanol to obtain 3-[p-(dimethylaminomethyl)-anilino]-4,6-dinitro-2'-anilino-4'-chlorodiphenylamine. Reduction of the latter with zinc in an acetic acid medium and then oxidation with oxygen gave 2-[p-(dimethylaminomethyl)-anilino]-3-imino-5-phenyl-7-chloro-3,5-dihydrophenazine having a melting point greater than 220° C.

Reaction of the latter with ethanolamine gave 2-[p-(dimethylaminomethyl) - anilino] - 3 - β - hydroxyethylimino-5-phenyl-7-chloro-3,5-dihydrophenazine.

As far as is known, all the compounds thus obtained are not described in the literature.

Example X.—Preparation of 2 - [p-(dimethylaminomethyl)-anilino] - 3 - (β-hydroxy-propylimino) - 5-p-chlorophenyl-3,5-dihydrophenazine Step A: 3-[p-(dimethylaminomethyl)-anilino] - 4,6-dinitro-2' - p-chloroanilinodiphenylamine.—24 g. of 1,3-dichloro-4,6-dinitrobenzene were dissolved in 40 cc. of hot 2-ethoxyethanol and the solution was cooled to about 20° C. A mixture of 17 g. of p-amino-N,N-dimethylbenzylamine and 11 g. of triethylamine in 20 cc. of 2-ethoxyethanol were added thereto. The reaction mixture turned red, the temperature rose and with gentle cooling it was held below 50° C. 1-chloro-3-[p-(dimethylaminomethyl)-anilino]-4,6-dinitrobenzene separated, stood overnight and was suction filtered. The precipitate was washed with methanol, then with water to eliminate the triethylamine hydrochloride completely to obtain a 95% yield of vermillion red crystals having a melting point of 129° C.–130° C.

70 g. of the product thus obtained, 44 g. of 2-amino-4'-chlorodiphenylamine and 200 cc. of dimethylformamide were heated for two hours at reflux and then were cooled to about 50° C. Water admixed with ammonia was added thereto and the mixture was suction-filtered. The precipitate was washed with water and was recrystallized from propanol to obtain an 85% yield of 3-[p-(dimethylaminomethyl)-anilino] - 4,6-dinitro-2'-p-chloroanilinodiphenylamine having a melting point of 165° C.

As far as is known, this compound is not described in the literature.

Step B: 2-[p-(dimethylaminomethyl)-anilino]-3-imino-5-p-chlorophenyl-3,5-dihydrophenazine.—The reduction of the dinitro derivative, obtained in Step A, was carried out as in Example I, in an acetic acid medium with powdered zinc. After elimination of the excess zinc and zinc acetate by filtration, the product was oxidized under agitation with oxygen until the latter was no longer absorbed. Then the acetic acid solution was concentrated in vacuo, made strongly alkaline with ammonia and was extracted with ethylene chloride. After dilution of the acetic acid solution with an equal volume of water, a solution of p-hydroxybenzene sodium sulphonate (3.3 mole per one mole at the outset), was added thereto and the reaction mixture was suction filtered. The precipitate was washed with water and the yield was practically quantitative. To isolate the free imino base from the said salt, the latter was suspended in water to which was added an excess of sodium hydroxide. The mixture was agitated in the presence of ethylene chloride. The ethylene chloride phase was separated and evaporated to dryness. The residue was taken up in ethanol from which it crystallized to obtain brilliant, reddish-brown crystals of 2-[p-(dimethylaminomethyl)-anilino]-3 - imino-5-p-chlorophenyl-3,5-dihydrophenazine having a melting point of 190° C.–195° C. It was readily soluble in dilute acids.

As far as is known, this compound is not described in the literature.

Step C: 2-[p-(dimethylaminomethyl)-anilino]-3-(β-hydroxypropylimino) - 5-p-chlorophenyl-3,5-dihydrophenazine.—By heating 2-[p-(dimethylaminomethyl)-anilino]-3-imino - 5 - p-chlorophenyl-3,5-dihydrophenazine with amino-1-propanol - 2,2 - [p-(dimethylaminomethyl)-anilino]-3-(β-hydroxypropylimino) - 5 - p-chlorophenyl-3,5-dihydrophenazine having a melting point of 208° C.–210° C. was formed.

As far as is known, this compound is not described in the literature.

Using the procedure described above, the following compounds of Formula IB were prepared.

imino-5-p-chlorophenyl - 3,5 - dihydrophenazine having a melting point of 170° C.

As far as is known, the three last compounds mentioned above are not described in the literature.

Various modifications of the compositions and process of the invention may be made.

We claim:
1. A compound selected from the group consisting of a 3,5-dihydrophenazine of the formula

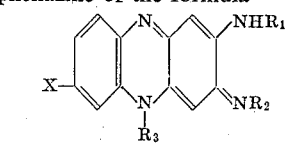

wherein X is selected from the group consisting of hydrogen and halogen, $R_1$ is phenyl substituted with a diloweralkylaminoloweralkyl connected to the benzene nucleus by a member selected from the group consisting of nitrogen, —$CH_2$— and oxygen, $R_2$ is lower alkyl containing a substituent selected from the group consisting of primary hydroxy, secondary hydroxy and α-lower alkyloxy-β-hydroxy and $R_3$ is phenyl which may be substituted with halogen or lower alkoxy and their non-toxic, pharmaceutically acceptable acid addition salts.

2. A compound of claim 1 wherein X is hydrogen.

3. A compound of claim 1 wherein $R_1$ is phenyl having a substituent selected from the group consisting of dilower alkylamino lower alkyl, diloweralkylamino-lower alkoxy and dilower alkylamino lower alkylamino.

4. A compound of claim 1 wherein $R_2$ is selected from

TABLE V

| $X_1$ | $X_2$ | $X_3$ | $X_4$ | R | R' | R'' | Melting Point, °C. |
|---|---|---|---|---|---|---|---|
| H | H | H | H | —⟨phenyl⟩—CH₂N(CH₃)(CH₃) | —CH₂CH₂CH₂OH | —⟨phenyl⟩—Cl | 220 |
| H | H | H | H | —⟨phenyl⟩—CH₂N(CH₃)(CH₃) | —CH₃ | —⟨phenyl⟩—Cl | 194 |
| H | H | H | H | —⟨phenyl⟩—CH₂N(CH₃)(CH₃) | —C₂H₅ | —⟨phenyl⟩—Cl | 225 |
| H | H | H | H | —⟨phenyl⟩—CH₂N(CH₃)(CH₃) | —C₃H₇—n | —⟨phenyl⟩—Cl | 208 |
| H | H | H | H | —⟨phenyl⟩—CH₂N(C₂H₅)(C₂H₅) | —CH₂CHOHCH₃ | —⟨phenyl⟩—Cl | 177 |
| H | H | H | H | —⟨phenyl⟩—CH₂N(CH₃)(CH₃) | —C₄H₉—n | —⟨phenyl⟩—Cl | 163 |

As far as is known, these compounds are not described in the literature.

Example XI.—Preparation of 2-[p-(pyrrolidinomethyl)-anilino]-3-β-hydroxy-propylimino - 5 - p-chlorophenyl-3,5-dihydrophenazine Using the procedure of Example X, the following compounds were successively obtained: 1-chloro-3-[p-(pyrrolidinomethyl)-anilino]-4,6-dinitrobenzene having a melting point of 135 to 137° C.; 3-[p-pyrrolidinomethyl)-anilino]-4,6-dinitro-2'-p-chloroanilinodiphenylamine having a melting point of 136 to 139° C.; 2-[p-(pyrrolidinomethyl)-anilino] - 3-imino-5-p-chlorophenyl-3,5-dihydrophenazine having a melting point greater than 225° C. and 2-[p - (pyrrolidinomethyl) - anilino]-3-β-hydroxypropylthe group consisting of primary hydroxy lower alkyl and α-lower alkoxy-β-hydroxy lower alkyl.

5. A compound selected from the group consisting of 2 - [p-(β-dimethylaminoethoxy)-anilino] - 3β - hydroxypropylimino-5-p-chlorophenyl-3,5-dihydrophenazine, and its non-toxic, pharmaceutically acceptable acid addition salts.

6. A compound selected from the group consisting of 2-[p-(dimethylaminomethyl)-anilino] - 3β - hydroxypropylimino-5-p-chlorophenyl-3,5-dihydrophenazine, and its non-toxic, pharmaceutically acceptable acid addition salts.

7. A compound of claim 1 which is selected from the group consisting of 2 - [p-(β-dimethylaminoethoxy)-anilino]-3-γ-hydroxy-propylimino - 5-p-chlorophenyl-3,5-dihydrophenazine and its non-toxic, pharmaceutically acceptable acid addition salts.

8. A compound of claim 1 which is selected from the group consisting of 2 - [p-(β-dimethylaminoethoxy)-anilino] - 3 - [3-methoxy-2-hydroxy-propyl]imino-5-p-chlorophenyl - 3,5-dihydrophenazine and its non-toxic, pharmaceutically acceptable acid addition salts.

9. A compound of claim 1 which is selected from the group consisting of 2 - [p-(β-dimethylaminoethoxy)-anilino]-3 - β-hydroxybutylimino-5-p-chlorophenyl-3,5-dihydrophenazine and its non-toxic, pharmaceutically acceptable acid addition salts.

10. A compound of claim 1 which is selected from the group consisting of 2-[p-(β-diethylaminoethoxy)-anilino-3-β-hydroxyethylimino-5 - phenyl - 3,5-dihydrophenazine and its non-toxic, pharmaceutically acceptable acid addition salts.

11. A compound of claim 1 which is selected from the group consisting of 2-[p-(β-diethylaminoethoxy)-anilino]-3-β-hydroxypropylimino - 5-phenyl-3,5-dihydrophenazine and its non-toxic, pharmaceutically acceptable acid addition salts.

12. A compound of claim 1 which is selected from the group consisting of 2 - [p-(β-dimethylaminoethoxy)-anilino]-3-β-hydroxyethylimino - 5-phenyl-3,5-dihydrophenazine and its non-toxic, pharmaceutically acceptable acid addition salts.

13. A compound of claim 1 which is selected from the group consisting of 2-[p-(β-diethylaminoethoxy)-anilino]-3-methylimino - 5 - p-chlorophenyl-3,5-dihydrophenazine and its non-toxic, pharmaceutically acceptable acid addition salts.

14. A compound of the formula

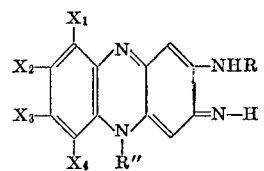

wherein $X_1$, $X_2$, $X_3$ and $X_4$ are selected from the group consisting of hydrogen and halogen and R is phenyl substituted with a diloweralkylaminoloweralkyl connected to the benzene nucleus by a member selected from the group consisting of oxygen, nitrogen and —$CH_2$— and $R''$ is selected from the group consisting of phenyl, halophenyl and lower alkoxy phenyl.

References Cited
UNITED STATES PATENTS 1,960,351   5/1934   Siebert et al. _____ 260—267

OTHER REFERENCES

Wagner et al.: Synthetic Organic Chemistry, John Wiley and Sons, Inc., New York, 1953, Chp. 24, Section 436 relied on, i.e., pp. 666–670.

Elderfield: Heterocyclic Compounds, vol. 6, Wiley and Sons, Inc., New York, 1957 (pp. 637–638 relied on).

ALEX MAZEL, Primary Examiner

ANNE MARIE T. TIGHE, Assistant Examiner

U.S. Cl. X.R.

260—293, 294.7, 326.5, 326.85, 574, 576; 424—250